United States Patent
Poyner et al.

(10) Patent No.: US 7,699,157 B2
(45) Date of Patent: Apr. 20, 2010

(54) SAFETY ARRANGEMENT

(75) Inventors: Julian Poyner, Stockport (GB); Derek Jones, Dumfries (GB); Derek Sawyer, Granada (ES); Burt Sacherski, Nashua, NH (US); Francis L. Leard, Sudbury, MA (US)

(73) Assignee: Rockwell Automation Limited, Milton Keynes (GB)

( * ) Notice: Subject to any disclaimer, the term of this patent is extended or adjusted under 35 U.S.C. 154(b) by 155 days.

(21) Appl. No.: 11/753,637

(22) Filed: May 25, 2007

(65) Prior Publication Data

US 2008/0289937 A1    Nov. 27, 2008

(51) Int. Cl.
B65G 47/24   (2006.01)
B65G 29/00   (2006.01)
B65G 47/00   (2006.01)

(52) U.S. Cl. .............. 198/383; 198/507; 198/389; 198/406; 198/416; 198/525

(58) Field of Classification Search ............ 198/322, 198/323, 502.1, 502.4, 571, 573, 810.01
See application file for complete search history.

(56) References Cited

U.S. PATENT DOCUMENTS

| | | | | |
|---|---|---|---|---|
| 4,461,459 A | * | 7/1984 | Conti | 254/134.3 FT |
| 4,743,752 A | * | 5/1988 | Olsen et al. | 250/206.1 |
| 4,863,012 A | * | 9/1989 | Nord et al. | 198/781.09 |
| 4,977,998 A | * | 12/1990 | Middeldorp | 198/395 |
| 5,021,766 A | * | 6/1991 | Genahr et al. | 340/544 |
| 5,184,009 A | * | 2/1993 | Wright et al. | 250/227.11 |
| 5,394,098 A | * | 2/1995 | Meyrueix et al. | 324/750 |
| 5,842,554 A | * | 12/1998 | Stoxen et al. | 198/322 |
| 5,992,604 A | * | 11/1999 | Buescher et al. | 198/322 |
| 6,196,101 B1 | * | 3/2001 | Van Den Bulcke | 83/277 |
| 6,230,871 B1 | * | 5/2001 | Balzer-Apke et al. | 198/323 |
| 6,420,846 B1 | * | 7/2002 | Wolfe | 318/463 |
| 2006/0096777 A1 | * | 5/2006 | Glew | 174/113 C |
| 2006/0285105 A1 | * | 12/2006 | Fayolle et al. | 356/73.1 |
| 2007/0098342 A1 | * | 5/2007 | Temple et al. | 385/113 |

\* cited by examiner

*Primary Examiner*—Gene Crawford
*Assistant Examiner*—Yolanda Cumbess
(74) *Attorney, Agent, or Firm*—Boyle Frederickson LLP; William R. Walbrun

(57) ABSTRACT

A safety arrangement for use with a piece of equipment. The safety arrangement includes a signal generating unit for generating an optical signal, an elongate element, and a signal detecting unit. The elongate element is disposed along, about, around or through the piece of equipment and is capable of transmitting an optical signal. The signal detecting unit detects an optical signal. The signal generating unit is connected to the signal detecting unit by the elongate element such that the signal detecting unit is in optical communication with the signal detecting unit. The signal detecting unit is arranged to detect a change in the optical signal transmitted by the elongate element as a consequence of movement of the elongate element and, upon detection of the change in the signal, the detecting unit is configured to effect a change in the operation of the piece of equipment.

25 Claims, 6 Drawing Sheets

SAFETY ARRANGEMENT

BACKGROUND

The present invention relates to a safety arrangement and in particular to a piece of equipment provided with a safety arrangement.

In industry, for example, a wide range of equipment is used. The equipment often requires some form of power to operate. The equipment may be electrically powered, pneumatically powered or hydraulically powered, for example. The equipment may be moveable, or be a machine with moving parts. A typical example of electrically powered equipment used in both light and heavy industry is the conveyor. A conveyor is a mechanical device for conveying articles or materials during manufacture, processing or packaging. A specific example of a conveyor is a conveyor belt, which is an endless moving belt made of rubber, canvas, etc., and which is used to convey articles or materials from one place to another.

Conveyor belts are widely used and have a wide variety of applications. A conveyor belt may be used in a small-scale commercial environment, for example in a self-service restaurant. A conveyor belt may also be used in a large-scale heavy industrial environment, such as in the quarrying and mining industries. A conveyor belt utilizes a continuously moving belt of material to convey material from one location to another. The belt is moved by rotating rollers or the like. It is quite possible that a user of the conveyor belt, or somebody working in the environment in which the conveyor belt is used, could get caught in the conveyor belt. If the user is caught in the conveyor belt, they can cause the conveyor belt to become jammed, or, in some situations, be injured by the conveyor belt. While this problem may not be so prevalent in applications where the conveyor belt is relatively small and low powered, this problem can be particularly relevant to industrial applications where the conveyor belts used are generally larger and more powerful.

In the quarrying and mining industries, for example, the conveyor belts used need to be both large (to be able to convey large volumes of material), and powerful (to be able to convey large weights of material). Accordingly, it is an important consideration in the control and configuration of such systems to prevent unintended operator interference with the conveyor. It is for these and other reasons that safety arrangements have been designed and incorporated into equipment requiring power to operate, such as the conveyor belt. The general principal behind such safety arrangements is that when the safety control system is activated, power is prevented from being supplied to the equipment. Therefore, even if a user unintentionally interferes with operation in a conveyor belt, operation of the conveyor is interrupted.

FIG. 1 illustrates a conveyor belt provided with a prior art safety arrangement. The conveyor belt comprises a belt 1 which surrounds a plurality of rollers 2. In an elevated configuration, the belt 1 and rollers 2 are supported by supports 3. The belt 1 is made from any suitable material, such as rubber, canvas, etc.

Attached to one of the supports 3 is a safety switch 4. A rope 5 (or other elongate flexible elements, such as a cable or the like) is attached to the safety switch 4. An end of the rope 5 opposite safety switch 4 is attached to another of the supports 3 that is located remote from the support 3 to which the safety switch 4 is attached. The rope 5 extends through eyelets 6 which serve to support the rope 5 and enhance the operation of the safety arrangement, as described in more detail below. In one example of the operation of the safety arrangement, the rope 5 is arranged to be under tension, and this may be achieved via the use of a tensioning device 7 mounted on the rope 5. When the rope 5 has been put under sufficient tension, an actuator 8 provided on the safety switch 4 is moved to put the safety switch 4 in a conducting state. That is, the safety switch allows electricity to be supplied to the rollers 2 of the conveyor belt.

During operation, if a user desired to quickly suspend operation of belt 1 or rollers 2 of the conveyor belt, the user can pull on the rope 5. When the rope 5 is pulled, the tension on the rope increases, and this effect is enhanced by the fact that the rope 5 passes through the eyelets 6. As a consequence of the tension on the rope 5 increasing, a mechanism within the safety switch 4 is moved to put the safety switch 4 into a non-conducting state. That is, when the rope 5 is pulled, the safety switch 4 prevents electricity being supplied to the rollers 2 of the conveyor belt. When no electricity is applied to the rollers 2 of the conveyor belt, the belt 1 stops moving. In the event a user has become undesirably entangled with the conveyor belt, pulling rope 5 terminates operation of the conveyor thereby reducing the detrimental affects of the user's interference with the conveyor. The safety of the conveyor belt has therefore been improved by the incorporation of the safety arrangement.

Although the safety arrangement illustrated in FIG. 1 does improve the safety of the conveyor belt (or other powered equipment), it does have its disadvantages. In known safety arrangements similar to that illustrated in FIG. 1, the tolerances required to keep the safety arrangement in a useful operating condition are high. For example, safety standards are often imposed on the use of such safety arrangements. A safety standard may require that the safety switch 4 moves from a conducting to a non-conducting state when the rope 5 has moved only 3 mm. Whether or not standards are imposed on the safety arrangement, it is often difficult to set up and maintain a reliable operating condition. The rope 5 needs to be accurately tensioned in order for the safety switch 4 to remain in a conducting state when the rope 5 has not been pulled, so that the conveyor belt is not stopped unless it is desired to do so.

When the conveyor belt and the safety arrangement are used outdoors, it is even more difficult to stay within the tolerances required to maintain a reliable operation condition. Thermal expansion or contraction due to variations in temperature in which the conveyor belt is used can make it difficult or impossible to set up the safety arrangement reliable operation. Furthermore, if the conveyor belt is long, the longer the rope 5 that is required. As the length of rope 5 is increased, it becomes even more difficult to accurately tension the rope 5 and ensure that it does not expand or contract to such a degree as to prevent the safety arrangement from working reliably.

Depending upon the conditions in which the safety arrangement is used, it has been found that the rope 5 can only be a maximum length of around 50 m to 150 m before it becomes too difficult to accurately and reliably set up the safety arrangement and ensure that it continues to operate reliably. The restriction on the length of the rope 5 necessarily limits the length of the conveyor belt to which a safety arrangement can be applied. If the conveyor belt is longer than 150 m in length, it becomes impractical to use a single safety arrangement as shown in FIG. 1. Although this may not be a problem in small commercial or industrial applications, where conveyor belts commonly only run for a few tens of meters, it can be a persistent and costly problem to overcome in heavy industry, where conveyor belts may extend for many kilometres. When conveyor belts extend for many kilometres a plurality of the safety arrangements of FIG. 1 must be used, as illustrated in FIG. 2. The use of a plurality of safety arrangements has a number of drawbacks. For example, the greater number of safety arrangements increases the cost associated with equipping the conveyor with a safety arrangement that runs the length of the conveyor. Also, if the conveyor belt is high above the ground, or extends across dangerous or difficult terrain, it can be difficult to determine which of the safety switches 4 has been moved to a non-conducting state to stop the conveyor belt from working. Although it may be relatively straight forward to determine which safety arrangement has been activated if an operator manually activated one of the multiple safety systems, it can be more difficult if, for example, the safety arrangement has been moved into a non-conducting state due to changes in environmental conditions, or due to rocks or trees (etc) hitting or pulling on the rope.

It is therefore an object of the present invention to obviate or mitigate at least one disadvantage of the prior art, whether mentioned above or elsewhere.

BRIEF DESCRIPTION OF THE INVENTION

According to a one aspect of the present invention, a safety arrangement for use with a piece of equipment is disclosed. The safety arrangement includes a signal generating unit for generating an optical signal and an elongate element that is to be disposed along, about, around or through the piece of equipment. The elongate element is capable of transmitting an optical signal. The safety arrangement includes a signal detecting unit for detecting an optical signal. The signal generating unit is connected to the signal detecting unit by the elongate element, such that the signal detecting unit is in optical communication with the signal detecting unit. The signal detecting unit is arranged to detect a change in the optical signal transmitted by the elongate element as a consequence of movement of the elongate element and, upon detection of the change in the signal, the detecting unit is configured to effect a change in the operation of the piece of equipment.

According to another aspect of the present invention, a piece of equipment is disclosed which includes a safety arrangement. The safety arrangement includes a signal generating unit for generating an optical signal and an elongate element that is to be disposed along, about, around or through the piece of equipment. The elongate element is capable of transmitting an optical signal that is detectable by a signal detecting unit. The signal generating unit is connected to the signal detecting unit by the elongate element, such that the signal detecting unit is in optical communication with the signal detecting unit. The signal detecting unit is arranged to detect a change in the optical signal transmitted by the elongate element as a consequence of movement of the elongate element and, upon detection of the change in the signal, the detecting unit is configured to effect a change in the operation of the piece of equipment.

A further aspect of the present invention discloses a method of affecting the operation of a piece of equipment. The piece of equipment is provided with an elongate element that is capable of transmitting an optical signal and which is disposed along, about, around or through the piece of equipment. An optical signal is sent along the elongate element and monitored for changes in the optical signal. If a change in the optical signal is detected, operation of the piece of equipment is affected.

Yet another aspect of the present invention discloses a safety arrangement for use with a piece of equipment. The safety arrangement includes a signal generating unit for generating a pressure wave signal. An elongate element is disposed along, about, around or through the piece of equipment and is capable of transmitting the pressure wave signal. A signal detecting unit detects a pressure wave signal and the signal generating unit is connected to the signal detecting unit by the elongate element. The signal detecting unit is arranged to detect a change in the pressure wave signal transmitted by the elongate element as a consequence of movement of the elongate element and, upon detection of the change in the signal, the detecting unit is configured to effect a change in the operation of the piece of equipment.

Another aspect of the present invention provides a method of affecting the operation of a piece of equipment that is provided with an elongate element that is capable of transmitting a pressure wave signal and which is disposed along, about, around or through the piece of equipment. The method includes sending a pressure wave signal along the elongate element; monitoring the pressure wave signal sent along the elongate element for changes in the pressure wave signal; and if a change in the pressure wave signal is detected as a consequence of movement of the elongate element, affecting the operation of the piece of equipment.

A further aspect of the present invention provides a safety arrangement for use with a piece of equipment. The safety arrangement includes a signal generating unit for generating an electrical signal, an elongate element to be disposed along, about, around or through the piece of equipment and capable of transmitting an electrical signal, and a signal detecting unit for detecting an electrical signal. The signal generating unit is connected to the signal detecting unit by the elongate element such that the signal detecting unit is in electrical communication with the signal detecting unit. The signal detecting unit is arranged to detect a change in the electrical signal transmitted by the elongate element as a consequence of movement of the elongate element and, upon detection of the change in the signal, the detecting unit is configured to effect a change in the operation of the piece of equipment.

Another aspect of the invention discloses a method of affecting the operation of a piece of equipment that is provided with an elongate element that is capable of transmitting an electrical signal and which is disposed along, about, around or through the piece of equipment. The method includes sending an electrical signal along the elongate element; monitoring the electrical signal sent along the elongate element for changes in the electrical signal; and if a change in the electrical signal is detected as a consequence of movement of the elongate element, affecting the operation of the piece of equipment.

A safety arrangement for use with a piece of equipment in accordance with another aspect of the invention includes an elongate element to be disposed along, about, around or through the piece of equipment. The elongate element is provided with a component sensitive to changes in magnetic fields and which is fixed in position relative to the elongate element. The component is in communication with a monitoring apparatus. A magnet is located adjacent to the elongate element and the monitoring apparatus is arranged to detect changes in the component sensitive to changes in magnetic fields as a consequence of movement of the component sensitive to changes in magnetic fields, and thus the elongate element, relative to the magnet. Upon detection of a change in the component sensitive to changes in magnetic fields, the monitoring apparatus is configured to effect a change in the operation of the piece of equipment.

A method of affecting the operation of a piece of equipment according to another aspect of the invention is also disclosed. The piece of equipment includes an elongate element that is disposed along, about, around or through the piece of equipment. The elongate element is provided with a component sensitive to changes in magnetic fields which is fixed in position relative to the elongate element. A magnet is located adjacent to the elongate element. The method of affecting the operation of the piece of equipment includes monitoring the component sensitive to changes in magnetic fields for changes in the magnetic fields. If a change in the component sensitive to changes in magnetic fields is detected as a consequence of movement of the elongate element, the method affects the operation of the piece of equipment.

A further aspect of the present invention discloses a safety arrangement for use with a piece of equipment. The safety arrangement includes an elongate element to be disposed along, about, around or through the piece of equipment. The elongate element is provided with a magnet which is fixed in position relative to the elongate element. A component sensitive to changes in magnetic fields is located adjacent to the elongate element and in communication with monitoring apparatus. The monitoring apparatus is arranged to detect changes in the component sensitive to changes in magnetic fields as a consequence of movement of the magnet, and thus the elongate element, relative to the component sensitive to changes in magnetic fields. Upon detection of a change in the component sensitive to changes in magnetic fields, the monitoring apparatus is configured to effect a change in the operation of the piece of equipment.

According to another aspect of the present invention, a method of affecting the operation of a piece of equipment that is provided with: an elongate element disposed along, about, around or through the piece of equipment, the elongate element being provided with a magnet which is fixed in position relative to the elongate element, and a component sensitive to changes in magnetic fields located adjacent to the elongate element is disclosed. The method includes monitoring the component sensitive to changes in magnetic fields for changes in the magnetic fields and if a change in the component sensitive to changes in magnetic fields is detected as a consequence of movement of the elongate element, affecting the operation of the piece of equipment.

These and various other features, aspects, and advantages of the present invention will be made apparent from the following detailed description and the drawings.

BRIEF DESCRIPTION OF THE DRAWINGS

Embodiments of the present invention will now be described, by way of example only, with reference to the accompanying Figures, in which like features have been given identical reference numerals, and in which.

DETAILED DESCRIPTION OF THE PREFERRED EMBODIMENTS

Figure 1:
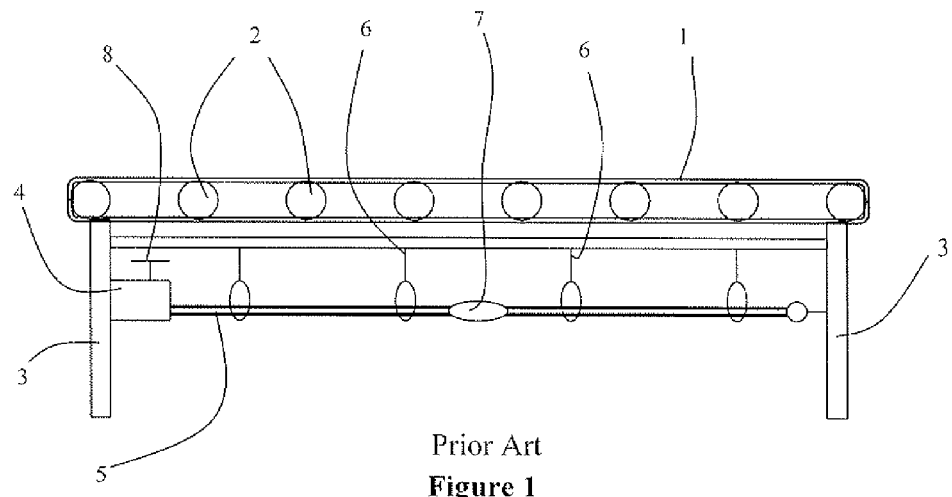
FIGS. 1 and 2 illustrate a prior art safety arrangement used in conjunction with a conveyor belt.
Figure 2:
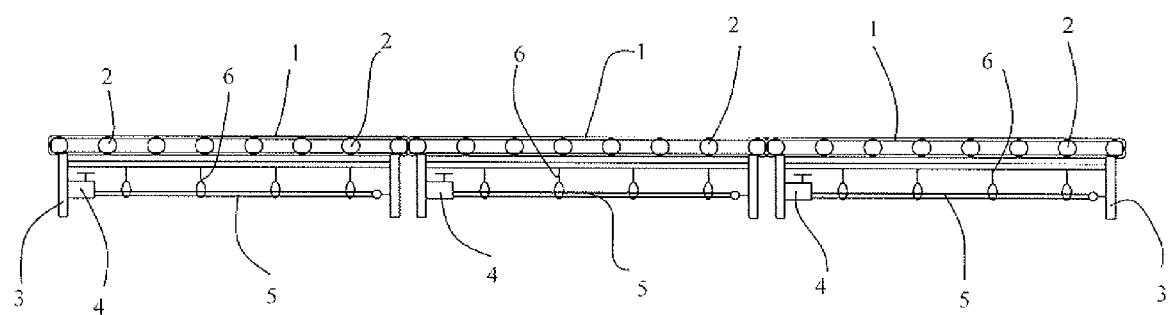
Figure 3A:
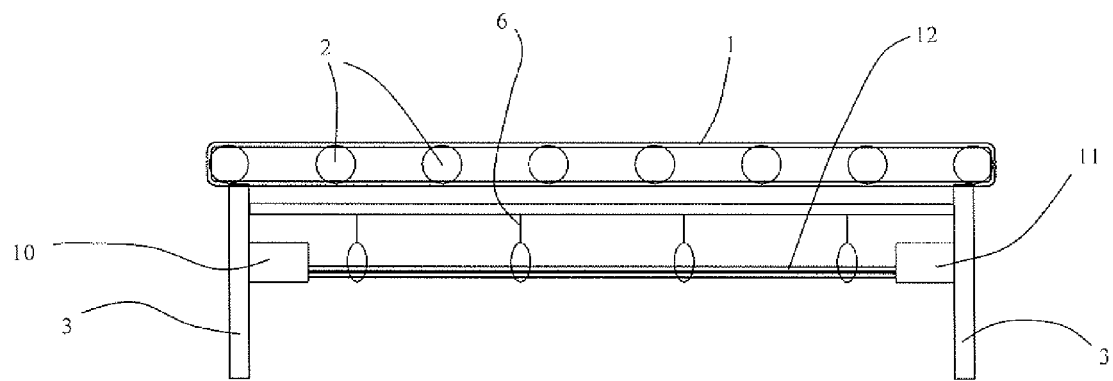
FIGS. 3a and 3b depict a conveyor belt and safety arrangement according to an embodiment of the present invention.

FIG. 3a depicts a conveyor belt similar to that of FIGS. 1 and 2. That is, the conveyor belt comprises a plurality of rollers 2 which are rotatable to move a belt 1 which surrounds the rollers 2. The belt 1 and rollers 2 are supported by supports 3. However, in accordance with one embodiment of the present invention, the conveyor belt of FIG. 3a is provided with a safety arrangement different than that illustrated in FIGS. 1 and 2.

The safety arrangement used in conjunction with the conveyor belt of FIG. 3a comprises a signal generating unit 10 and a signal detecting unit 11. The signal generating unit 10 is in communication with the signal detecting unit 11 via a cable 12. The cable 12 is attached to the signal generating unit 10 and also to the signal detecting unit 11, and extends through eyelets 6. The eyelets 6 support the cable 12 and also enhance the operation of the safety arrangement, as will be described in more detail below.

In use, a signal is generated by the signal generating unit 10 and sent along the cable 12 in the direction of the signal detecting unit 11. The signal may be optical, pressure wave like (e.g. acoustic or a compression wave travelling through a solid/fluid) or electrical in nature or any other signal which may be transmitted along the cable. If a user desires to suspend operation of the conveyor belt, they can pull the cable 12. Pulling on the cable 12 affects the signal which is being transmitted by the cable 12 from the signal generating unit 10 to the signal detecting unit 11. The change in the signal is detectable by the signal detecting unit 11. In response to the change in the signal, the signal detecting unit 11 acts to prevent power from being supplied to the conveyor belt. For example, the signal detecting unit 11 may itself move from a conducting to a non-conducting state upon detection of a change in the signal. Alternatively, the signal detecting unit 11 may provide a signal to other control means when a change in the signal is detected, the other control means preventing power from being supplied to the conveyor belt.

When power is no longer supplied to the conveyor belt, the belt 1 is prevented from moving. Therefore, the user may remove personnel or obstructions from the conveyor belt.

In the prior art safety arrangements described in relation to FIGS. 1 and 2, careful tensioning of the rope 5 had to be undertaken to ensure that the safety arrangement operated reliably. Various problems were discussed in relation to this setup, for example the high tolerances involved and the susceptibility of the safety arrangement to changes in response to environmental conditions. The safety arrangement according to embodiments of the present invention does not suffer from these drawbacks. The optical and/or electrical detection systems used to detect pulling of the cable 12, provide a purely non-mechanical detection system. This means that there may be less wear and tear on the safety arrangement. Furthermore, it is easy to set up the safety arrangement, because its general operation, and its safety functions, are not fully dependent on the arrangement being under tension. Furthermore, the detection arrangements according to the present invention enhance the ability of the detection system to detect extremely small changes in electrical or optical signals. Therefore, the safety arrangement according to embodiments of the present invention can be extremely sensitive to movements of the cable. Since the use of optical and electrical signals may be processed electronically, the nature of changes in the signal may be accurately determined over a given period of time. For example, it may be possible for the safety arrangement to be programmed with (or to learn) what signals, or changes in signals, are characteristic of certain events. For example, the safety arrangement may be able to differentiate between a user pulling on the cable, and for example, a rock falling on the cable. This means that, if for example, a rock falls on the cable 12, the conveyor belt will not be stopped. Similarly, the safety arrangement can take into account slowly varying environmental conditions, so that a change in temperature of the cable (which would cause it to expand or contract) does not cause the signal detecting unit to prevent power being supplied to the conveyor belt. The time of flight of a signal sent along the cable 12 can be used as a baseline against which changes can be measured. If the time of flight varies, for example, due to environmental conditions, the baseline will move, and will not cause the power supply to the conveyor belt to be interrupted.

If changes in a pressure wave type signal passed along the cable 12 are used to detect pulling of the cable, the majority of the advantages discussed in relation to optical and electrical signals still apply. Although the generation and detection of a pressure wave type signal will be undertaken mechanically, by, for example, the use of piezoelectric element, the mechanical stresses on such a arrangement will be much less than prior art safety arrangement.

Figure 3B:
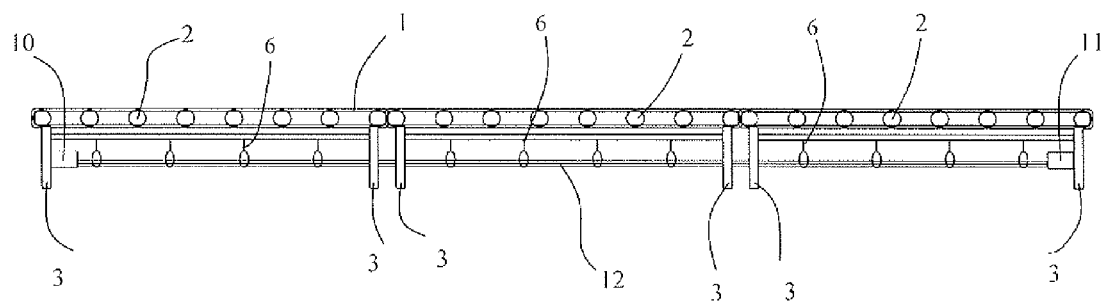

Due to the high tolerances required with the prior art safety arrangement, it was difficult to have a rope 5 extending more than about 50 m to 150 m before it became too difficult to reliably setup the safety arrangement. For conveyor belts longer than 50 m to 150 m, it therefore became necessary to use a plurality of prior art safety arrangements. This is not the case with the present invention, since the mechanical tolerances are no longer such an issue. It can be seen from FIG. 3*b* that a single signal generating unit 10, cable 12 and signal detecting unit 11 may be used to provide a safety arrangement extending along the full length of the belt 1 (or along a plurality of adjacent conveyor belts). Since fewer safety arrangements are required in comparison with the prior art, the costs of purchase, installation and maintenance are reduced. Using existing technologies (for example, those associated with optical communication networks), the cable 12 which extends between the signal generating unit 10 and the signal detecting unit 11 maybe a kilometre long or more. Therefore, a single safety arrangement according to embodiments of the present invention could, quite readily, replace 6 to 20 prior art safety arrangements and be individually tailored to various conveyor configurations.

Different embodiments and operating principles of the safety arrangement according to embodiments of the present invention will now be described.

Figure 4A:
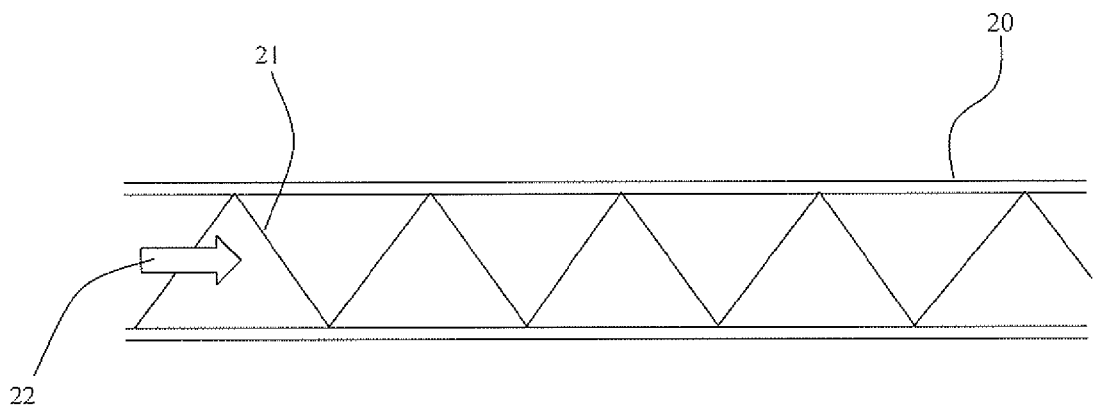
FIGS. 4a and 4b depict operating principles of a safety arrangement according to an embodiment of the present invention.

FIG. 4*a* illustrates a cable 20 which is capable of transmitting an optical signal 21 (although it will be appreciated that any elongate element capable of transmitting an optical signal may be used). The cable 20 may preferably be or comprise an optical fibre, or be a wire or cable supporting an optical fibre. The signal 21 may be generated by an LED, a laser (diode or otherwise), or any other suitable source (such as those used in optoelectronic communications). Changes in the signal 21 may be detected using any appropriate optical detection apparatus that is capable of detecting the changes of interest. For example, if a change in intensity is expected, a photodiode may be used.

The direction of travel of the optical signal 21 is shown by arrow 22. It can be seen that when the cable 20 is straight and un-bent, the optical signal 21 passes through the cable 20 in an unperturbed fashion.

Figure 4B:
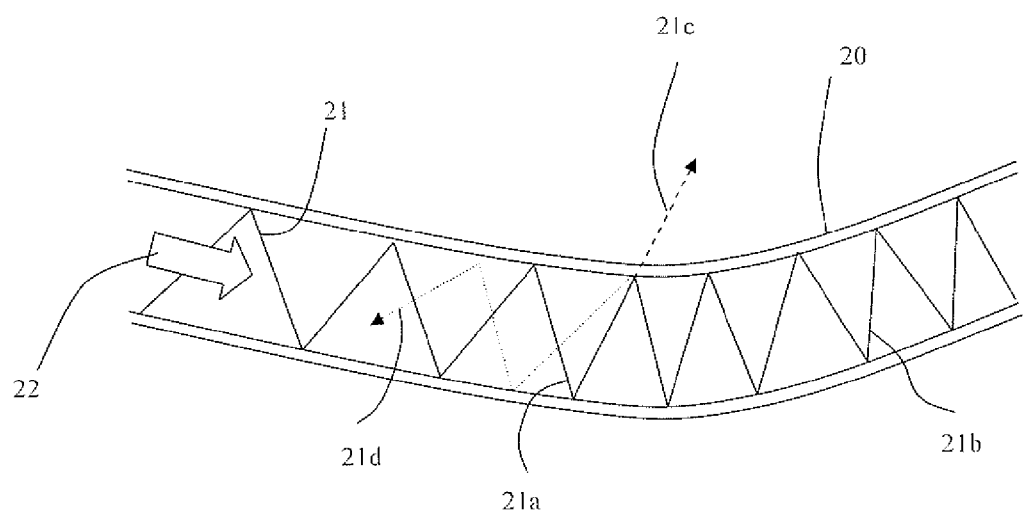

FIG. 4*b* depicts the situation when the cable 20 is bent, for example, by a user pulling on the cable 20 when the user desires to stop the conveyor belt of FIG. 3*a*. In general, it can be seen that the optical signal 21 is affected by the cable 20 being bent. Although FIG. 4*b* is schematic and may not accurately reflect the physical processes which occur when the cable 20 is bent, it does nevertheless schematically depict the general principles of the operation of a safety arrangement incorporating such a cable 20. In general then, it can be seen that there are a number of effects on the optical signal 21 upon bending of the cable 20. For example, it can be seen that the optical signal before the bend 21*a* has a different angular relationship with side walls of the cable 20 than the optical signal after the bend 21*b*. Due to this change in the angular relationship at the bend, some of the optical signal 21 is lost 21*c* from the cable 20, causing a reduction in the intensity of the optical signal after the bend 21*b* in comparison with the optical signal before the bend 21*a*. Furthermore, bending the cable 20 has caused a portion of the optical signal 21*d* to be reflected back along the cable 20. Even though small, the bending of cable 20 has caused the optical signal 21 to travel further. Therefore, the time taken for the signal to pass from the signal generating unit 10 of FIG. 3*a* to the signal detection unit 11 (i.e. the time of flight) will be increased. In another mode of operation, by using two or more optical signals, a change in phase between the two signals may be used to detect a pull on the cable. In yet another mode, a change in the polarization state of a polarized optical input signal (either transmitted by or reflected at some point along the cable) may be used to detect a pull of the cable. A polarization maintaining optical fibre will need to be used for such a mode of operation.

All of the effects mentioned in the previous paragraph can be detected. The change in wavelength of the optical signal 21 can be detected and measured using optoelectronics, for example using apparatus incorporating filters such as fibre bragg gratings. Similarly, the change in the intensity of the optical signal 21 can be measured using a photodiode or the like. The reflected part 21*d* of the optical signal 21 can be measured using the signal generating unit 10 itself, if this unit is capable of such detection. The time of flight of the optical signal 21 can be measured by using a pulsed optical signal 21. If the length of the cable 20 is known, as well as the speed of light within that cable, the expected time taken for the pulsed optical signal 21 to pass from the signal generating unit 10 to the signal detection unit 11 can be determined. If the time exceeds that expected, the optical signal 21 has traveled further than it would under normal operation, and from this determination it can be determined that the cable 20 has been bent. Using one or more of the effects on the optical signal 21, it may be possible to determine where along the cable the bending has taken place. For example, if part of the optical signal 21 is reflected back towards the signal generating unit 10, and this unit 10 can detect as well as generate optical signals, the distance along the cable 20 at which point the cable has been bent can be determined using simple mathematics. If the speed of light within the cable is known, as well as the time taken for the signal to leave the signal generating unit 10 and return to the signal generating unit 10 after being reflected, the distance along the cable 20 at which point it has been bent can be determined.

It will be appreciated that the detection of the pull of the cable may be undertaken in a digital (i.e. pull or no pull) or analogue manner (i.e. to what extent has the cable been pulled).

The use of the eyelets 6 described in relation to FIGS. 1 to 3 may enhance the detection of a bend or pull in the cable 20.

If the cable 20 is pulled, it will bend about the eyelets 6 which support the cable 20 either side of where it has been pulled. These eyelets 6 will introduce local stress points on the cable 20 when the cable 20 is pulled. These points of stress will induce a change in the refractive index of the cable 20, which can lead to light loss, etc from the cable 20 which is detectable as mentioned above.

It will be apparent that, when pulled, the cable attached to an eyelet equipped conveyor, will actually bend at three points. That is, when pulled, the cable 20 will bend at the point at which it is pulled, and will also bend about the eyelet 6 either side of the part of the cable 20 which has been pulled. Therefore, it is quite possible that a measurement used to determine the distance along the cable at which point it has been bent may yield more than one result. However, this is unlikely to be problematic in practice, since only an approximate location of the bend in the cable is likely to be required.

Even an approximate location for the pull in the cable 20 is useful. For example, even an approximate location will be sufficient to reduce the time needed to locate a user or other interference (for example a tree branch or animal etc) that has unintentionally interfered with the operation of the conveyor. In the case of locating a user who has undesirably interfered with operation of the conveyor, the safety arrangement of the present invention allows other personal to quickly determine the position of the personnel in the event the personnel become somehow entangled with the conveyor. In the case of locating a tree branch that has fallen onto the cable 20, the time saved in locating the branch reduces the downtime in the use of the conveyor belt, which could result in monetary savings.

As mentioned above, the safety arrangement could be able to differentiate between pulls on the cable 20 by a user, and a pull by a rock. This could be achieved by looking for characteristic changes in the signal 21, or by comparing the changes in the signal with known reference signals.

When using an optical signal, the cable 20 may extend over a kilometre or more before a detecting unit or a booster (e.g. repeater) station of some sort is required. This distance may be increased by incorporating fibre lasers. The detecting unit may incorporate a booster station, so that an optical signal may be detected for changes and also boosted and sent along another cable, and so on. A single signal generating unit and a single detecting unit may be used, the two units being connected by more than one cable and booster stations.

When a change in the signal is detected, the detecting unit can alert an operator. For example, the detecting unit may emit a sound or light, or even send a signal to another central processing unit. This signal may be sent via the cable itself. The central processing unit may then alert an operator. All detecting units may be connected to the central processing unit.

FIGS. 4a and 4b have been used to describe how changes in the transmission of an optical signal can be used to detect a pull on the cable 20. The same or similar changes may be detectable in signals other than those of an optical nature. For example, the signal sent along the cable may be a pressure wave type signal or an electrical signal.

Figure 5:
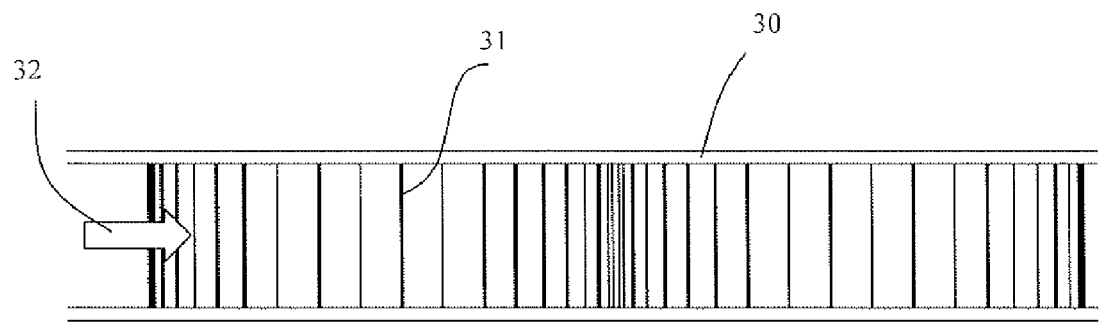
FIGS. 5 and 6 depict alternative embodiments of the safety arrangement of the present invention.

FIG. 5 illustrates a cable 30 that is capable of transmitting a pressure wave type signal (although it will be appreciated that any elongate element capable of transmitting a pressure wave type signal may be used). The cable 30 may be, for example, made from a metallic material. A pressure wave signal 31 is shown being transmitted by the cable 30 in the direction of the arrow 32. The pressure wave signal 31 is typically longitudinal in nature, and may be any suitable frequency, for example ultrasonic. The pressure wave signal 31 may be generated and detected using, for example, one or more piezoelectric elements. The pressure wave signal 31 may be continuous, or comprise a plurality of pulses. A pull in the cable 30 can be detected in much the same way as described above in relation to the detection of a change in the optical signal 21 of FIGS. 4a and 4b. For example, a pull in the cable 30 of FIG. 5 may result in: a change in the wavelength of the pressure wave signal 31, a change in the intensity of the pressure wave signal 31, a change in the time-of-flight of the pressure wave signal 31 or a part of the signal 31 being reflected back towards where it was generated. All of these effects can be detected in a known manner using known equipment, for example using piezoelectric elements.

Figure 6:
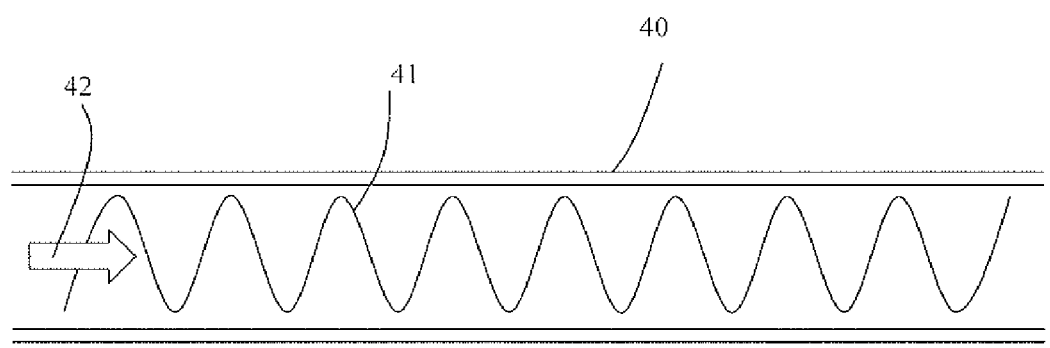

FIG. 6 illustrates a cable 40 that is capable of transmitting an electrical signal (although it will be appreciated that any elongate element capable of transmitting an electrical signal may be used). The cable 40 may be, for example, made from a metallic material or any other electrically conductive material. An electrical signal 41 is shown as being transmitted by the cable 40 in the direction of the arrow 42. The electrical signal 41 may be generated using a signal generator or the like. The electrical signal 41 may be continuous, or comprise a plurality of pulses. A pull in the cable 40 can be detected in much the same way as described above in relation to the detection of a change in the optical signal 21 of FIGS. 4a and 4b. For example, a pull in the cable 40 of FIG. 6 may result in: a change in the wavelength of the electrical signal 41, a change in the intensity of the electrical signal 41, or a part of the electrical signal 41 being reflected back towards where it was generated. All of these effects can be detected in a known manner using known equipment, for example using voltmeters, ammeters, oscilloscopes, etc. Furthermore, the user holding or pulling the cable 40 may change the electrical resistance or capacitance of the cable 40 which may also be detected using) for example, voltmeters, ammeters, oscilloscopes, etc.

Figure 7:
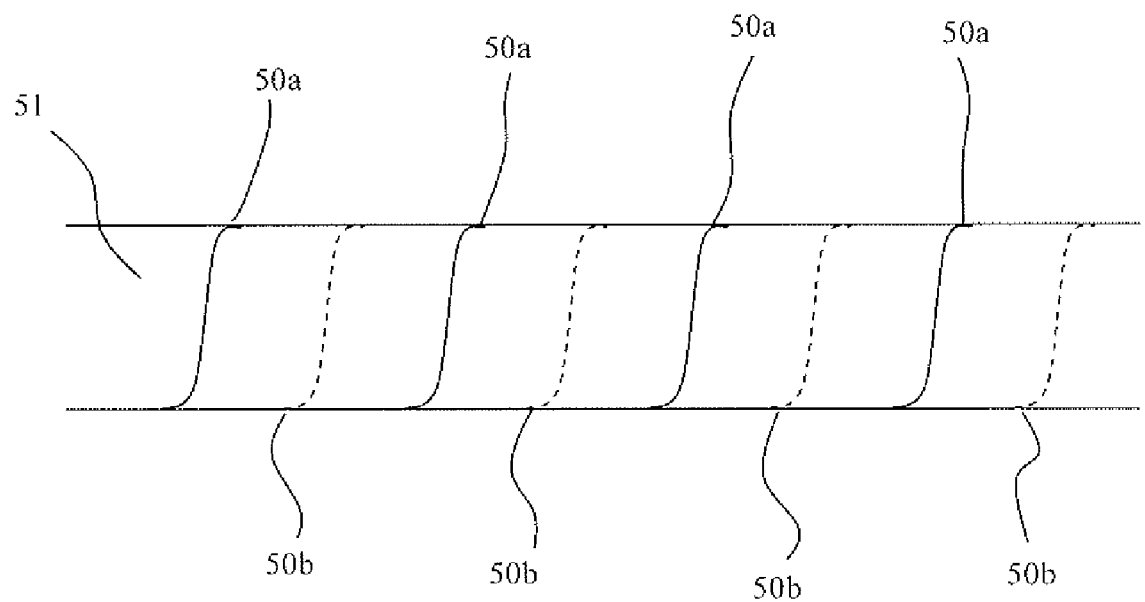
FIGS. 7 and 8 depict different configurations of the safety arrangement according to an embodiment of the present invention.
Figure 8:
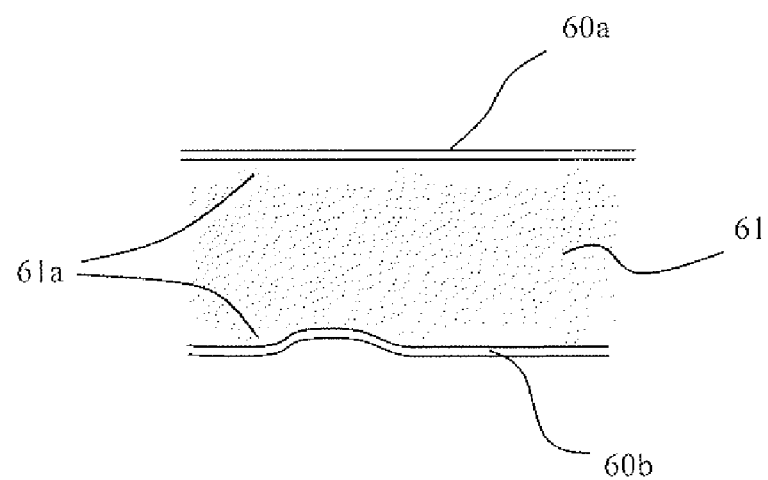

FIGS. 7 and 8 illustrate improvements of the safety arrangements described so far. The arrangements in FIGS. 7 and 8 will be described in relation to the detection of changes in optical signals, although the improvements are also applicable to the detection of pressure wave or electrical signals.

FIG. 7 shows a first optical fibre 50a which extends along and has been wound around an electrically conductive cable 51. Also wound around the electrically conductive cable 51 is a second optical fibre 50b. The second optical fibre 50b can be used to improve the redundancy of the safety arrangement. For example, changes in signals sent along both the first and second optical fibres 50a, 50b can be simultaneously detected. Alternatively, only the first optical fibre 50a may be used, and the second optical fibre 50b only used if the first optical fibre 50a breaks.

The cable 51 is electrically conductive, which means that, for example, it can be used to supply power to devices to which the cable 51 is attached. Alternatively, or additionally, the cable 51 can also be used to send information. For example, the cable 51 of FIG. 7 may be used to connect the signal generating unit 10 and signal detection unit 11 of FIG. 3. Power can be supplied to the signal generating unit 10 and the electrically conductive cable 51 can be used to supply part of this power to the signal detecting unit 11. Additionally, if the signal detecting unit 11 detects a change in the optical signal sent along the cable 51 of FIG. 7 (or, for example, any other cable incorporating optical fibres) it can communicate this detection back to the signal generating unit if desired.

FIG. 8 shows in cross-section a third optical fibre 60a and a fourth optical fibre 60b running along a cable 61. The cable 61 is provided with protrusions 61a. The protrusion 61a serve to increase the stress on (and bending effect of) the optical fibres 60a, 60b when the cable 61 is grabbed by a user. This is illustrated by the fourth optical fibre 60b, which is bent. The bending of the optical fibre 60b about the protrusions 61a further increases the bending effect of the cable 61 being pulled and/or grabbed by a user. This means that pulling of the cable 61 is more readily detectable.

Figure 9A:
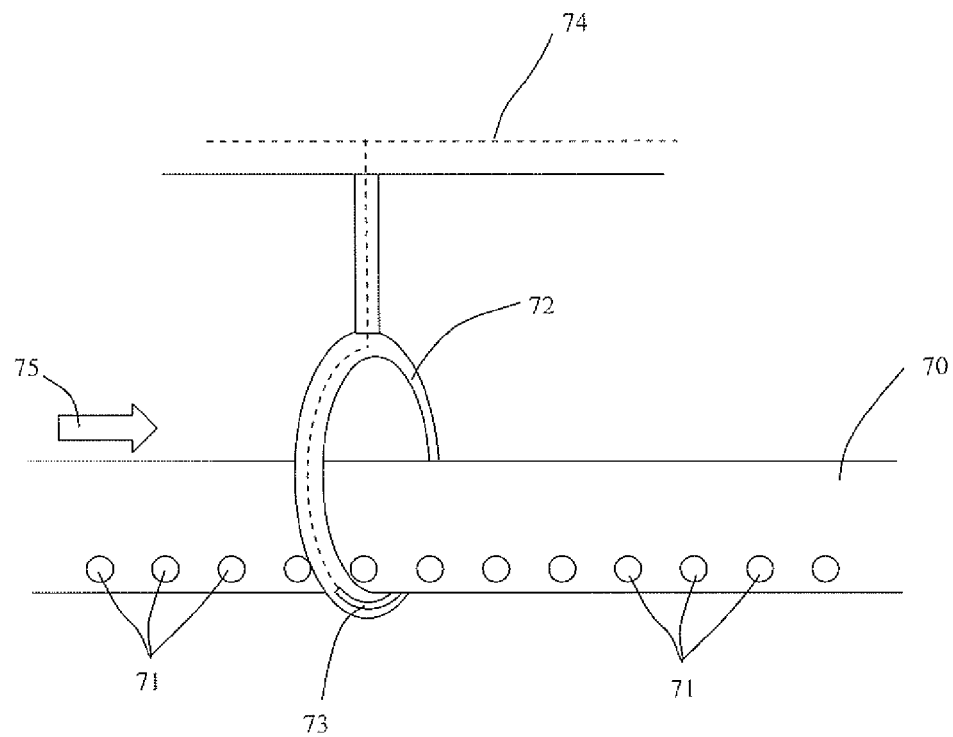
FIGS. 9a and 9b depict another embodiment of the present invention.
Figure 9B:
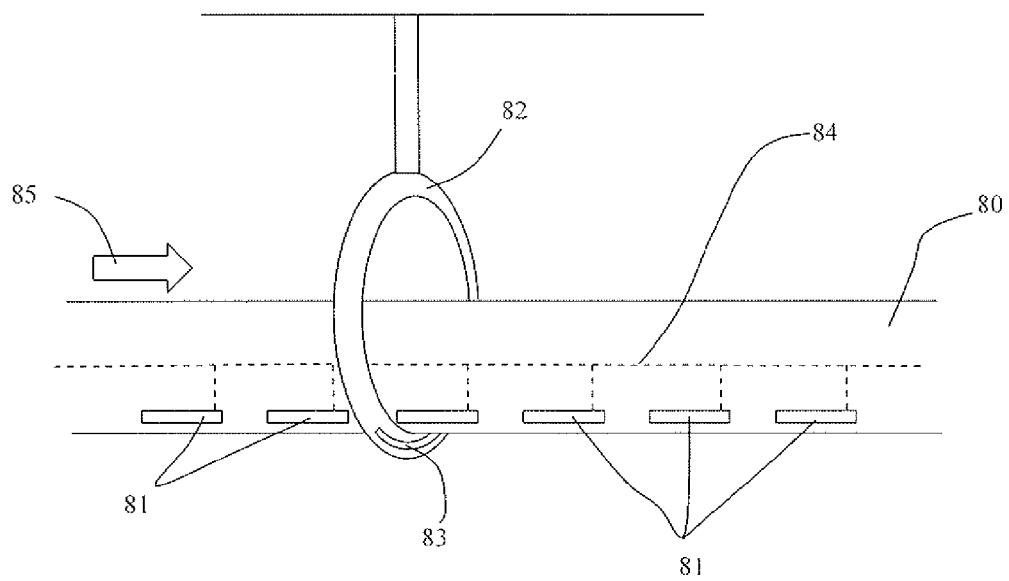

FIGS. 9a and 9b depict other embodiments of the safety arrangement, in which a combination of electricity and magnetism is used to detect a pull of a cable.

FIG. 9a depicts a cable 70. Extending on, within, or along the cable 70 are a plurality of permanent magnets 71. The cable 70 passes through eyelets 72 (only one eyelet being shown in the Figure). The eyelet 72 is provided with a Hall effect transistor 73. The Hall effect transistor 73 is connected to a monitoring apparatus (not shown in the Figure) by way of a wire 74. The wire 74 may electrically connect together one or more other eyelets.

The amplification of the Hall effect transistor 73 is proportional to the magnetic field to which it is exposed. If the cable 70 is pulled it will move, for example, in the direction of the arrow 75. Movement of the cable 70 causes the magnets 71 to move relative to the Hall effect transistor 72. As the magnets 71 move relative to the Hall effect transistor 73, the magnetic field to which the Hall effect transistor 73 is exposed changes, which in turn means that the amplification of the Hall effect transistor 73 changes. This change in amplification can be readily detected by, for example monitoring the current or voltage output of the Hall effect transistor 73. Thus, a change in the amplification of the Hall effect transistor 73 can be used to determine that the cable 70 has been pulled.

FIG. 9b illustrates a different arrangement, but which uses the same general operating principles as discussed in relation to FIG. 9a. FIG. 9b shows a cable 80. Extending on, within, or along the cable 80 are a plurality of Hall effect transistors 81. The cable 80 passes through eyelets 82 (only one eyelet being shown in the Figure). The eyelet 82 is provided with a permanent magnet 83. The plurality of Hall effect transistors 81 are interconnected by wires 84. The wires 84 also connect the Hall effect transistors 81 to a monitoring apparatus (not shown).

When the cable 80 is pulled it moves, for example, in the direction shown by arrow 85. When the cable 80 moves, the Hall effect transistors 85 move relative to the magnet 83. When the Hall effect transistors 81 move relative to the magnet 83, the magnetic field to which the Hall effect transistors 81 are exposed changes. Such change resulting in a change in the amplification of the Hall effect transistors 81. This change in amplification can be detected by, for example, monitoring the current or voltage output of the Hall effect transistors 81. Therefore, a change in amplification of the Hall effect Transistors 85 can be used to determine that the cable 80 has been pulled.

In FIGS. 9a and 9b electrical connections between the Hall effect Transistors 73, 81 and monitoring apparatus have been described schematically as wires 74, 84. However in practice it will be appreciated that more complex wiring arrangements, plus additional circuit components, may be required. Such arrangements and components are well known in the art, and will not be described in more detail here.

In FIGS. 9a and 9b Hall effect Transistors 73, 81 have been referred to. However, it will be appreciated that any component sensitive to changes in magnetic fields may be used. In FIGS. 9a and 9b permanent magnets have been referred to 71, 83. It will be appreciated that the magnets need not be permanent in nature. Instead, the permanent magnets 71, 83 may be replaced with elements which can generate magnetic fields, for example electromagnets.

So far, the safety arrangements have been described as detecting a change in the signal transmitted along a cable and the like. It will be appreciated that this change may not necessarily be subtle. For example, the change may be abrupt, for example if the cable becomes detached from a signal generating unit or a signal detecting unit.

The embodiments given above have been described with reference to use with a conveyor belt. However, the safety arrangements can be used with any suitable equipment in order to effect the operation of the equipment. For example, the cables described may extend around, about, along or through an enclosure in which is located kinetic machinery. If a user pulls the cable, a change in the signal transmitted by the cable can be detected and, as a result of the detection, the power to the machinery cut-off. In another example, the cables described may extend along the length of a train, or a carriage of the train. The cable may be exposed at certain specific points in the train. If a user pulls the cable, a change in the signal transmitted by the cable can be detected and, as a result of the detection, acted upon (for example, by automatically applying the brakes on the train, or alerting the driver to a problem). Notwithstanding the other possible uses of the safety arrangements according to embodiments of the present invention, the use of the safety arrangements with conveyor belts is particularly useful, given the advantages that they offer when compared with prior art safety arrangements.

It is not necessary that the supply of power to the equipment is cut-off upon detection of a pull in a cable or the like. As described above, the signal may be acted upon in any number of ways. For example, detection of a pull in the cable may be acted upon by affecting the operation of the equipment with which the safety arrangement is provided. For example, instead of cutting the supply of power to the equipment, a mechanism could be activated which prevents the equipment, or a part of the equipment, from moving (e.g. a break or mechanical interlock). The detecting unit may directly or indirectly effect a change in the operation of the equipment. For example, the detecting unit may directly prevent power being supplied to the equipment (e.g. by activation of a switch), or the detecting unit may provide a signal to another unit, this other unit preventing power being supplied to the equipment (e.g. by activation of a switch).

Although the detection in the changes of various forms of signal has been described, a safety arrangement which detects changes in optical signals transmitted along a cable or the like is preferable. The equipment used to implement such an optical safety arrangement may be taken from existing fields such as the optical communications field. Since such fields are already readily developed, technology exists which allows a safety arrangement which detects changes in optical signals transmitted along a cable or the like to be constructed cheaply, and operate reliably. Optical signals may be readily and reliably transmitted over large distances and around multiple corners.

It will be appreciated that the above embodiments have been described by way of example only. It will be appreciated by the skilled person that various modifications may be made to these and indeed other embodiments without departing from the invention as defined by the claims that follow.

What we claim is:

1. A safety arrangement for use with a piece of equipment, the safety arrangement comprising:

a signal generating unit for generating an optical signal;

an elongate element to be permanently disposed along, about, around or through the piece of equipment and positioned and oriented so that an operator can manually pull the elongate element to alter an operating condition of the piece of equipment, the elongate element being capable of transmitting an optical signal; and a signal detecting unit for detecting an optical signal;

the signal generating unit being connected to the signal detecting unit by the elongate element, such that the signal detecting unit is in optical communication with the signal generating unit, the signal detecting unit being arranged to detect a change in the optical signal transmitted by the elongate element as a consequence of movement of the elongate element by interaction from the operator and, upon detection of the change in the signal, the detecting unit is configured to effect a change in the operation of the piece of equipment; and wherein the signal generating unit comprises a laser.

2. A safety arrangement as claimed in claim 1, wherein the piece of equipment is a conveyor belt.

3. A safety arrangement as claimed in claim 1, wherein the signal detecting unit comprises a photo detector.

4. A safety arrangement as claimed in claim 1, wherein the elongate element comprises an optical fibre.

5. A safety arrangement as claimed in claim 4, wherein the optical fibre extends along a support cable.

6. A safety arrangement as claimed in claim 5, wherein the support cable is provided with protrusions.

7. A safety arrangement as claimed in claim 5, wherein the support cable is electrically conductive.

8. A safety arrangement as claimed in claim 1, wherein the elongate element comprises two optical fibres.

9. A safety arrangement as claimed in claim 1, wherein the detecting unit is, upon detection in the change of the optical signal, configured to directly affect the operation of the piece of equipment.

10. A safety arrangement as claimed in claim 1, wherein the detecting unit is, upon detection in the change of the optical signal, configured to indirectly affect the operation of the piece of equipment.

11. A safety arrangement as claimed in claim 1, wherein upon detection of the change in the signal, the detecting unit is configured to effect the prevention of the supply of power to the piece of equipment.

12. A safety arrangement as claimed in claim 1, wherein upon detection of the change in the signal, the detecting unit is configured to effect the prevention of movement of at least a part of the equipment.

13. A method of affecting the operation of a piece of equipment, the piece of equipment being provided with an elongate element that is capable of transmitting an optical signal, and which is disposed along, about, around or through the piece of equipment for being manipulated by an operator to cause a change of shape of the elongate element, the method comprising:

sending an optical signal along the elongate element;

monitoring the optical signal sent along the elongate element for changes in the optical signal caused by changes in shape of the elongate element due to operator pulling of the elongate element; and if a change in the optical signal is detected as a consequence of movement of the elongate element caused by direct operator interaction with the elongate element anywhere along the longitudinal length of the elongate element, affecting the operation of the piece of equipment.

14. A method as claimed in claim 13, wherein the piece of equipment is a conveyor belt.

15. A method as claimed in claim 13, wherein the elongate element comprises an optical fibre.

16. A method as claimed in claim 13, wherein the detected change is a change in intensity of the optical signal sent along the elongate element.

17. A method as claimed in claim 13, wherein the detected change is a change in a wavelength of the optical signal sent along the elongate element.

18. A method as claimed in claim 13, wherein the detected change is a change in a time of flight of the optical signal sent along the elongate element.

19. A method as claimed in claim 13, wherein the detected change is a change in a polarization state of the optical signal sent along the elongate element.

20. A method as claimed in claim 13, wherein two signals are sent along the elongate element.

21. A method as claimed in claim 13, wherein the detected change is a change in phase between the two signals.

22. A method as claimed in claim 13, wherein the signal is continuous.

23. A method as claimed in claim 13, wherein the signal comprises a plurality of pulses.

24. A method as claimed in claim 13, wherein affecting the operation of the piece of equipment comprises preventing power being supplied to the piece of equipment.

25. A method as claimed in claim 13, wherein affecting the operation of the piece of equipment comprises preventing movement of at least a part of the piece of equipment.

* * * * *